United States Patent

Friday et al.

Patent Number: 5,329,462
Date of Patent: Jul. 12, 1994

[54] EXPANSION VALVE CONTROL

[75] Inventors: Arthur F. Friday, Liverpool; Richard E. Ginn, Williamstown; Edward F. Wright, Jr., Cicero, all of N.Y.

[73] Assignee: Carrier Corporation, Syracuse, N.Y.

[21] Appl. No.: 996,441

[22] Filed: Dec. 24, 1992

[51] Int. Cl.$^5$ .................. F25B 41/00; G05B 13/02
[52] U.S. Cl. .................. 364/505; 364/510; 364/166; 62/50.4; 62/210
[58] Field of Search ............ 364/505, 506, 148, 153, 364/166; 62/50.4, 50.7, 117, 209, 210, 214, 222

[56] References Cited

U.S. PATENT DOCUMENTS

| | | |
|---|---|---|
| 4,523,435 | 6/1985 | Lord ............ 62/212 |
| 4,523,436 | 6/1985 | Schedel et al. ............ 62/222 |
| 4,593,881 | 6/1986 | Yoshino ............ 62/204 |
| 4,831,832 | 5/1989 | Alsenz ............ 62/117 |
| 5,067,326 | 11/1991 | Alsenz ............ 62/193 |
| 5,170,635 | 12/1992 | Wruck et al. ............ 62/151 |

*Primary Examiner*—Thomas G. Black
*Assistant Examiner*—Tan Q. Nguyen

[57] ABSTRACT

A control for the expansion valve of an air conditioning system interrupts a decision to deactivate one or more stages of compression and proceeds to calculate a new expansion valve position based upon the amount of capacity to be lost by the deactivated stages of compression. The expansion valve is commanded to the calculated position before the compressors are deactivated.

6 Claims, 5 Drawing Sheets

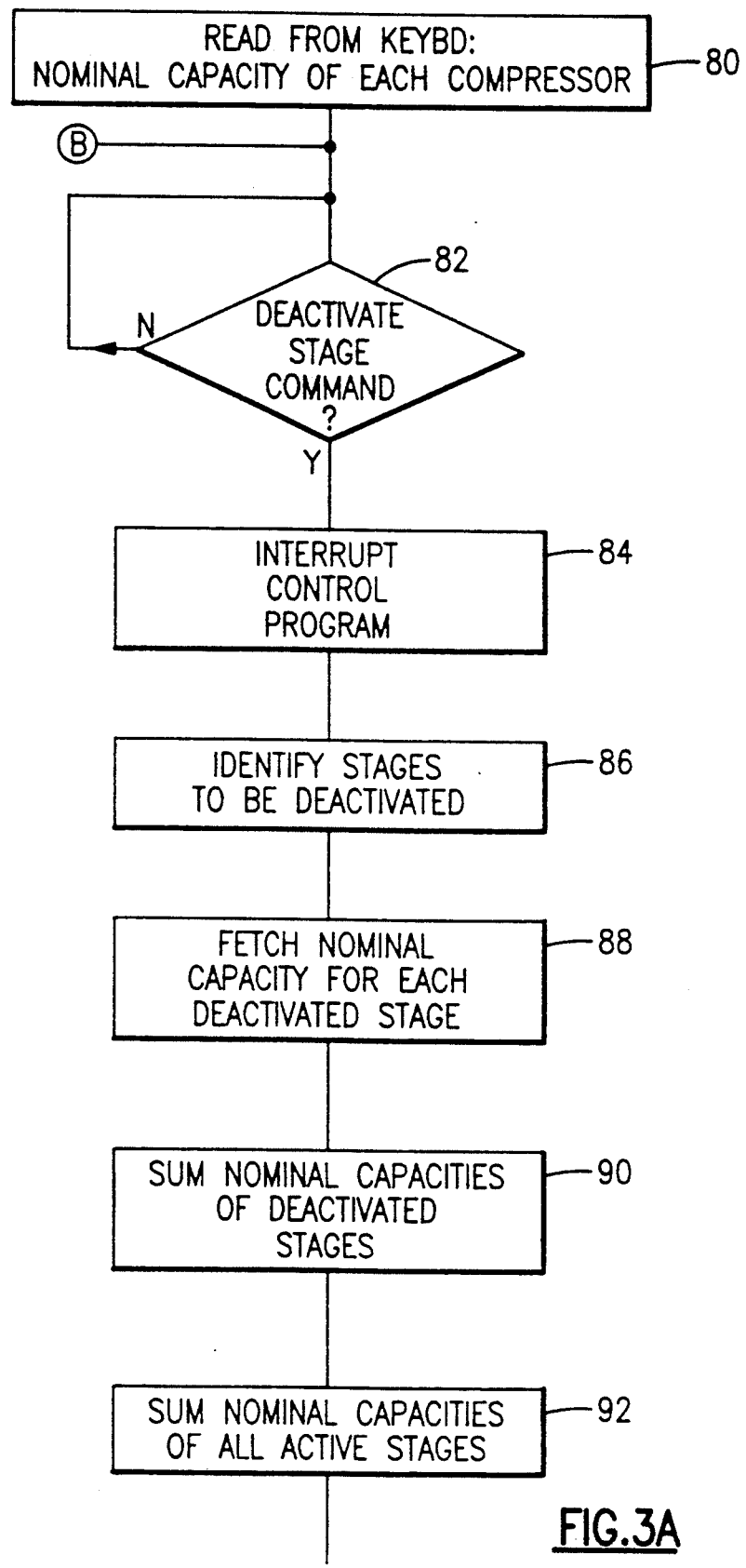

EXPANSION VALVE CONTROL

BACKGROUND OF THE INVENTION

This invention relates to the control of an air conditioning system. More particularly, this invention relates to the control of an expansion valve within an air conditioning system.

Air conditioning systems often have a plurality of compressor stages that can be individually activated or deactivated in response to the demand for cooling. These stages are typically activated or deactivated by a control program residing in a microprocessor dedicated to the control of the air conditioning system.

It has been found that a relatively high refrigerant flow condition will temporarily occur within the air conditioning system when the control program deactivates one or more compressor stages. This flow condition is typically corrected by throttling the expansion valve within the air conditioning system so as to thereby adjust the flow rate of the refrigerant within the system. This throttling action however usually occurs in response to the one or more stages having already been deactivated. In this regard, a typical expansion valve moves in response to a change in value of the superheat. It is to be noted that in extreme circumstances, the expansion valve may not react quickly enough and the superheat may drop low enough that liquid might enter the cylinders of the compressor. This may ultimately lower the life of the compressor.

SUMMARY OF THE INVENTION

It is an object of the invention to provide a control for the expansion valve of an air conditioning system which protects the system against the temporary high flow rate that otherwise might occur upon deactivating one or more stages of compression.

The above and other objects are achieved by providing an expansion valve control which adjusts the expansion valve before deactivation of the stages is allowed to occur. The expansion valve control is preferably a program residing in a microprocessor that may be running a number of other programs related to the overall control of the air conditioning system. The expansion valve control program is responsive to a decision having been made in another program to shut down or deactivate one or more compressors. The expansion valve control program immediately interrupts any process that would normally proceed to deactivate the compressors. The control program thereafter proceeds to obtain the current valve position and mathematically adjust this position as a function of the amount of capacity being lost by the deactivated compressors. The control program proceeds to command a new valve position and timely release the interrupt of the process for deactivating the compressors.

BRIEF DESCRIPTION OF THE DRAWINGS

Other objects and advantages of the present invention will be apparent from the following detailed description in conjunction with the accompanying drawings, in which.

DESCRIPTION OF THE PREFERRED EMBODIMENT

Figure 1:
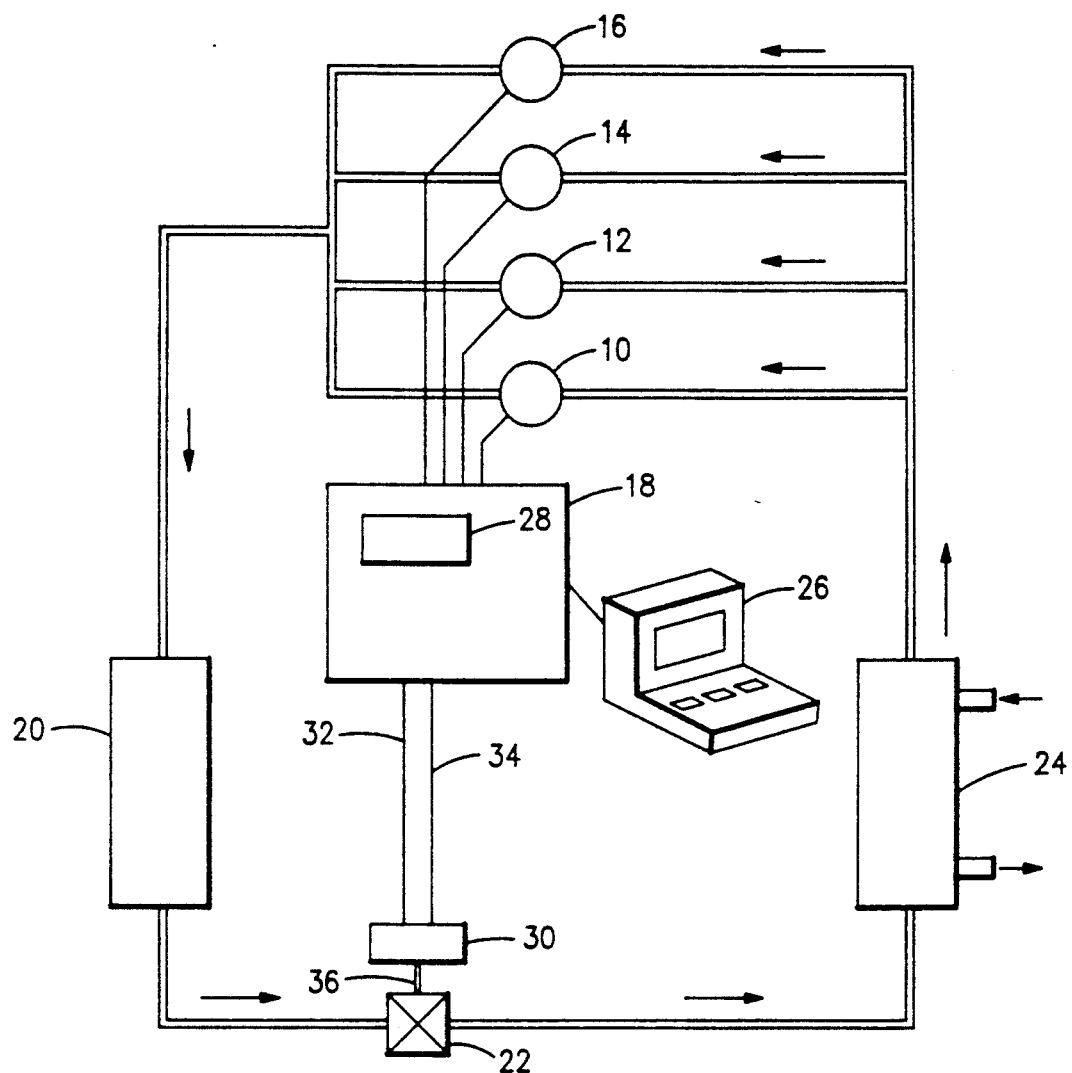
FIG. 1 illustrates an air conditioning system having a plurality of compressor stages that may be individually activated or deactivated by a controller that is also connected to an expansion valve within the system.

Referring to FIG. 1, an air conditioning system is seen to include a plurality of cooling stages 10, 12, 14 and 16 which may be selectively activated or deactivated by a controller 18. It is to be understood that each cooling stage will have a compressor and an electrical motor associated therewith that responds to a control signal from the controller 18. A given electrical motor will be switched on thereby activating an associated compressor when additional cooling is required as determined by the controller 18. The same electrical motor may be switched off by the controller 18 when a desired temperature is achieved.

Depending upon the number of active stages, refrigerant will flow at a certain flow rate through a condenser 20, an expansion valve 22 and an evaporator 24. The evaporator is seen to have an inlet and an outlet for processing a heat exchange fluid such as water. The refrigerant flow rate will vary as a function of the number of cooling stages that have been activated or deactivated by the controller 18. Adjustments will be made by the expansion valve 22 under the control of the controller 18 in a manner which will hereinafter be described. In the preferred embodiment, the controller may receive a series of programs and data by any input device including by way of example a keyboard terminal 26. These programs are executed by a microprocessor 28 within the controller 18.

The expansion valve 22 preferably includes control logic 30 that is responsive to a set of control signals received from the controller 18 via control lines 32 and 34. The control line 32 provides an indication as to the direction in which the expansion valve is to move. The control line 34 provides an appropriate logic level signal indicating when the control logic 30 is to begin and end moving the expansion valve. The control logic preferably includes a pulse generator (not shown) which generates pulses to a stepping motor (not shown). The stepping motor moves a shaft or worm gear 36 which moves in one of two directions depending on the control signal on the line 32. The shaft or worm gear 36 moves in the prescribed direction a predetermined amount dictated by the number of pulses applied to the step motor. The number of pulses applied to the step motor is defined by the time in which the logic level signal remains at a particular logic level on the control line 34.

Figures 2, 2A:
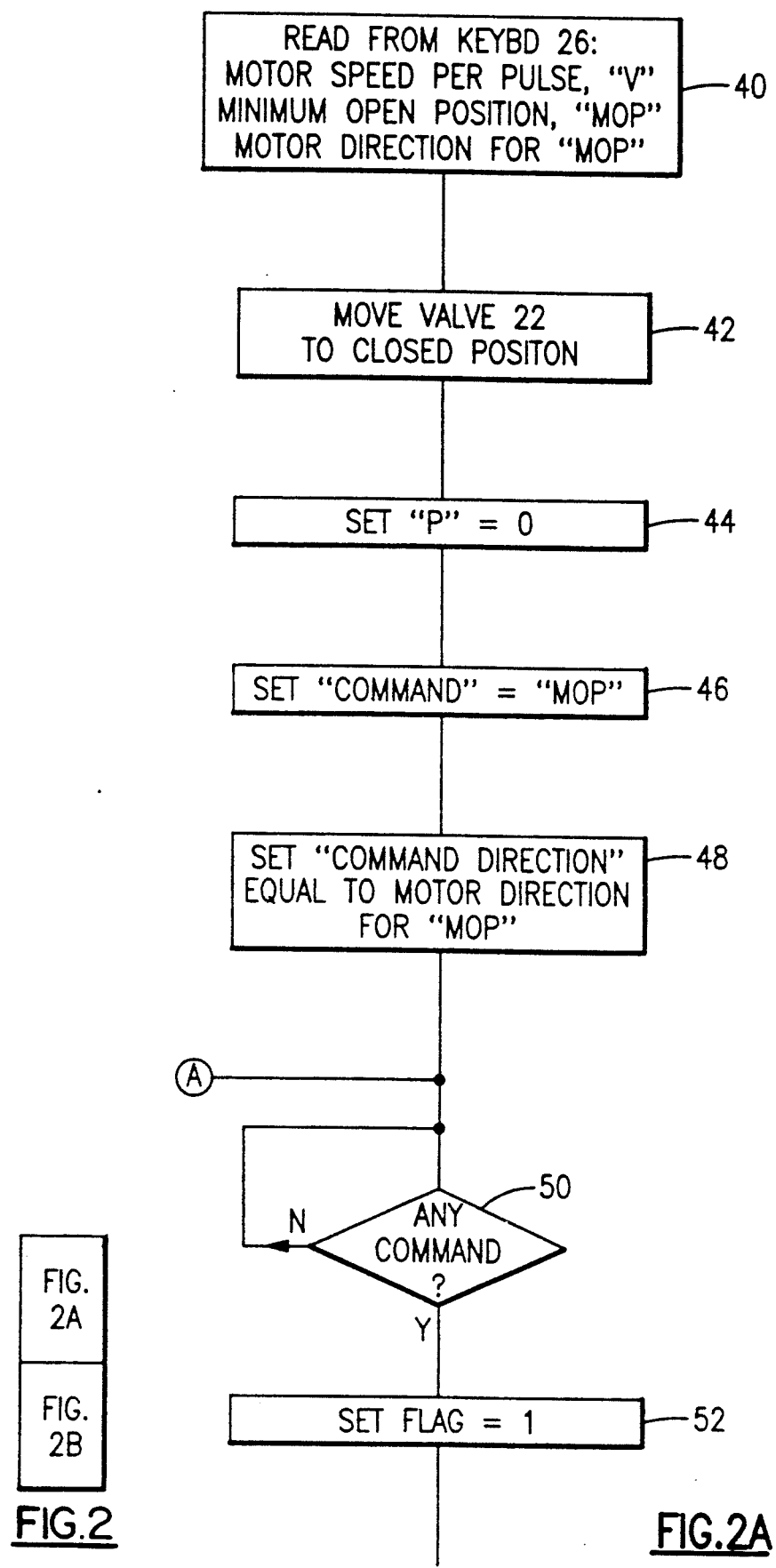
FIG. 2 comprises 2A and 2B which illustrates a program within the controller of FIG. 1 for monitoring the position of the expansion valve of FIG. 1.

Referring to FIG. 2A, a position monitoring program is seen to begin with a step 40. The step 40 reads certain information provided to the programmed microprocessor 28 within the controller 18 via the keyboard 26. The information that is provided includes a motor speed per pulse value "V". The microprocessor also receives a minimum open position "MOP" and a motor direction for "MOP" from the keyboard 26. The value "V" indicates the speed at which a particular pulse step is taken by the step motor within the control logic 30. The minimum open position "MOP" is a position from which the valve mechanism 22 normally is set at the beginning of valve operation. The microprocessor proceeds to a step 42 and issues a command to the control logic 30 to move the valve 22 in the closed direction for a significant number of steps so as to guarantee that the mechanical valve mechanism 22 will have moved to an absolutely closed position. The microprocessor proceeds to a step 44 and sets a variable "P" equal to zero. The microprocessor now proceeds to a step 46 and sets a "COMMAND" equal to "MOP". The microprocessor next proceeds to a step 40 and sets a "COMMAND DIRECTION" equal to the motor direction provided in step 40. The microprocessor proceeds to a step 50 and inquires as to whether any "COMMAND" has been received to move the valve. Since the "COMMAND" was set equal to "MOP" in step 46, the microprocessor will proceed to a step 52 and set a FLAG equal to binary one indicating that the valve is in the process of being moved. The microprocessor now moves to a step 54 and calculates the time "T" that it will take the control logic 30 to generate the number of pulses necessary to achieve the commanded position. This is accomplished by dividing the "COMMAND" by the value "V" attributable to motor speed per pulse.

The microprocessor will proceed from having calculated the time "T" in step 54 to a step 56 and will set a clock equal to "T". The microprocessor will next proceed to a step 58 and issue a signal to the control logic 30 via the line 32 to prepare to move in the "COMMANDED DIRECTION". The microprocessor will thereafter in a step 60 generate a logic level signal on the line 34. This signal will cause the control logic 30 to begin pulse generation. The microprocessor now proceeds to a step 62 and immediately begins decrementing the clock set equal to "T" in step 56. The microprocessor now proceeds to a step 64 and simply waits until the clock equals zero. At this point the microprocessor proceeds to a step 66 and immediately changes the logic level of the control signal on line 34 so as to stop pulse generation. The microprocessor now proceeds to a step 68 and sets the variable "P" equal to "P" plus "COMMAND". It is to be appreciated that since "P" was set equal to zero in step 44 and "COMMAND" was set equal to "MOP" in step 46, the initial setting of "P" will be the "MOP" value in step 68. The microprocessor proceeds to step 70 and resets the FLAG equal to zero. The microprocessor will now proceed to a point "A" which is the normal entry point into the position monitor program wherein a "COMMAND" is to be received from other software resident in the microprocessor. Any such "COMMAND" and associated "COMMANDED DIRECTION" will be processed through steps 50 through 70 as has been heretofore described. The new position of the valve 22 will be the previous position plus whatever "COMMAND" was received and processed.

Figure 2B:
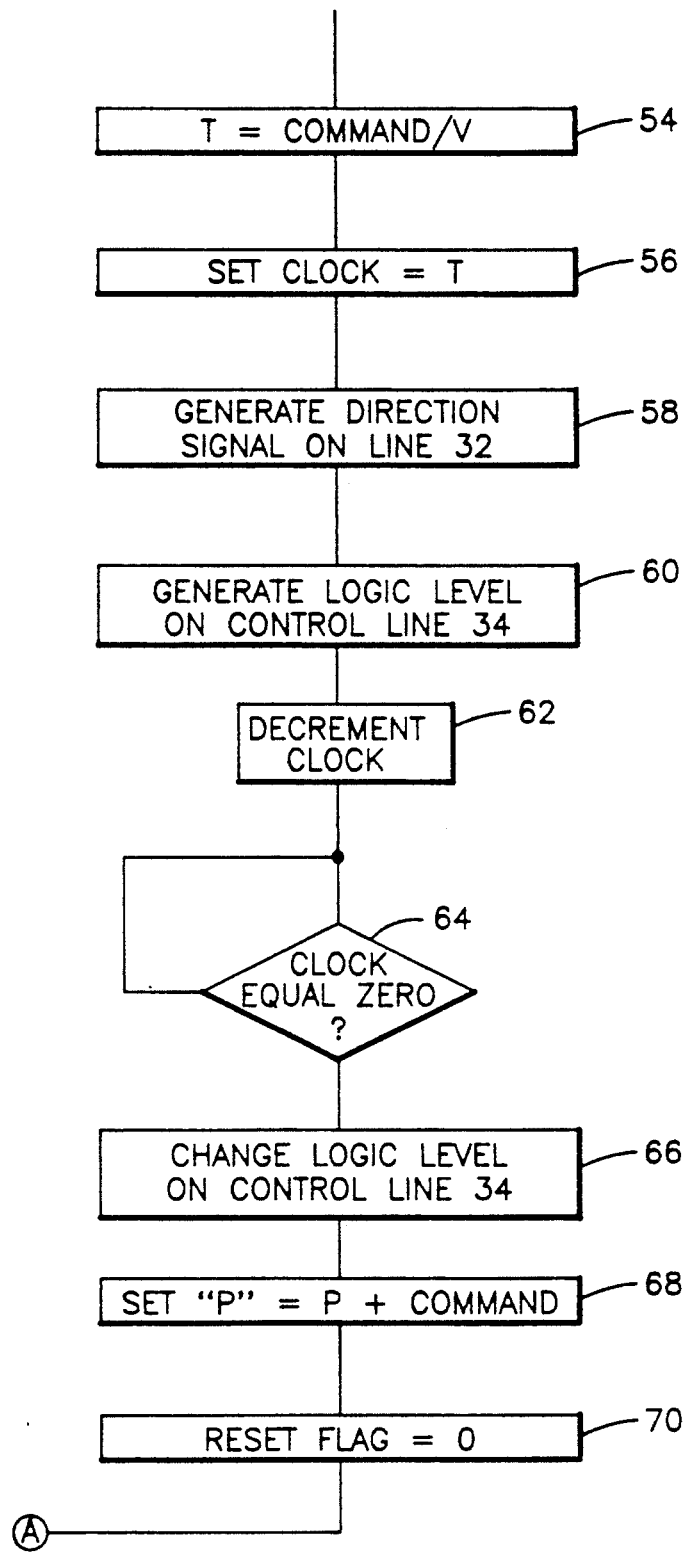
Figure 3B:
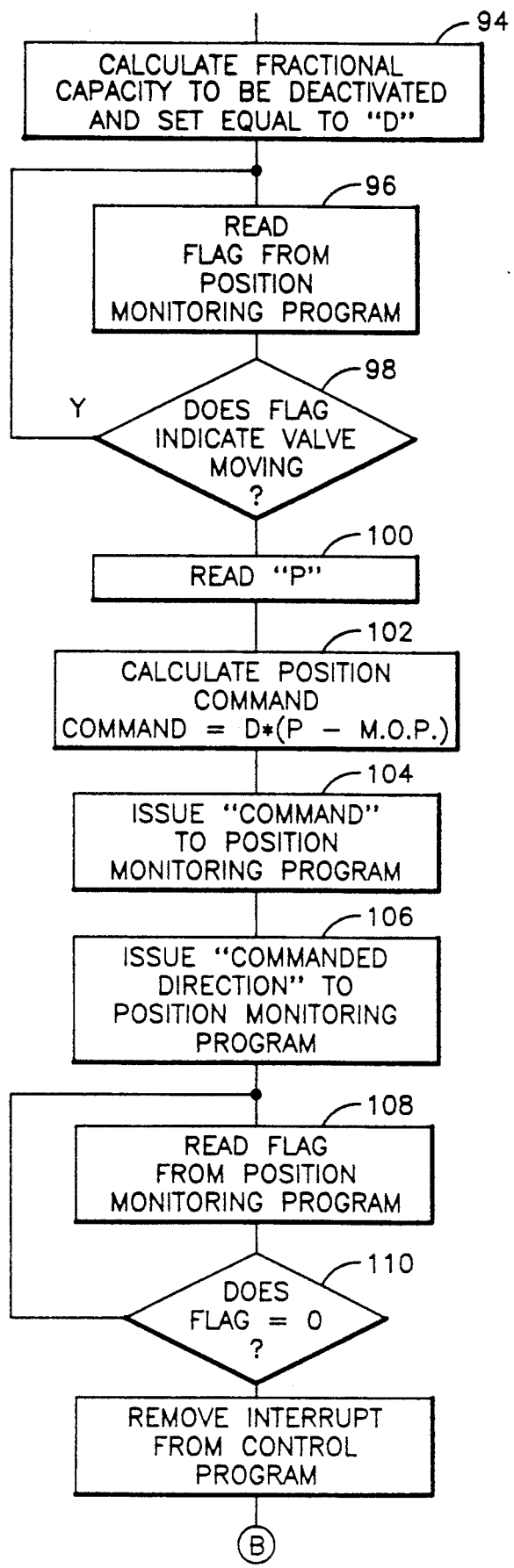
FIG. 3 comprises 3A and 3B which illustrates a control program within the controller of FIG. 1 for controlling the expansion valve of FIG. 1 in response to one or more compressor stages being deactivated.

Referring now to FIG. 3A, a particular control program which will be issuing a "COMMAND" and a COMMANDED DIRECTION is illustrated. The control program begins with a step 80 wherein information concerning the nominal capacity of each compressor within the stages 10 through 16 is read. The microprocessor proceeds to a step 82 and inquires as to whether a "DEACTIVATE STAGE COMMAND" signal has been received from control software resident within the microprocessor that normally issues such a command. In this regard, control software within the controller 18 will activate or deactivate the stages 10 through 16 in response to the air conditioning system having achieved certain temperature levels. This control software is well known in art and need not be disclosed in detail herein. In the event that such control software wishes to deactivate one or more stages, a "DEACTIVATE STAGE COMMAND" signal will be noted in step 82 and the microprocessor running the control program of FIG. 3A will immediately proceed to a step 84 and interrupt the control program generating the "DEACTIVATE STAGE COMMAND" signal. The microprocessor will now proceed to a step 86 and identify the stages that are to be deactivated. This would include a query of the control software to identify which of the stages 10 through 16 are to be deactivated. It is to be appreciated that various control programs will have their own distinct approaches of identifying particular stages to be deactivated. The microprocessor will proceed with the information obtained in step 86 to fetch the nominal capacity for each deactivated stage identified in step 86. The microprocessor will proceed in a step 90 to sum all such nominal capacities of deactivated stages. The microprocessor will proceed to a step 92 and first query the control software as to which of the stage 10–16 are currently active. The nominal capacity for each identified active stage will be fetched and summed in step 92. The microprocessor now proceeds to a step 94 and calculates the fractional capacity to be deactivated. This is accomplished by dividing the results of step 90 by the results obtained in step 92. The thus calculated fractional capacity is stored as a value "D" and the microprocessor proceeds to a step 96 and reads the FLAG from the position monitoring program. It will be remembered from the discussion of the position monitoring program in FIGS. 2A and 2B, that the FLAG will be set equal to a one when the position monitoring program is in fact moving the expansion valve 22 to a different position.

Referring to step 98, the microprocessor will await the FLAG being set equal to zero. The microprocessor will then proceed to a step 100 and read the current valve position, "P", as defined by the position monitoring program of FIG. 3. The microprocessor will now proceed to calculate a position "COMMAND" value in a step 102. The calculation includes obtaining the difference between the read position "P" in step 100 and the minimum operating position "MOP" of step 50. This difference is multiplied times the fractional capacity, "D" that was calculated in step 94. The results of this are the "COMMAND" of step 102. The microprocessor proceeds to a step 104 and issues the calculated "COMMAND" of step 102 to the position monitoring program. The microprocessor will also issue the "COMMANDED DIRECTION" in a step 106. This COMMANDED DIRECTION is always in the direction that will tend to close the valve 22.

The microprocessor will next proceed to a step 108 and inquire as to the status of the FLAG from the position monitoring program. The microprocessor will ask whether the FLAG indicates that the valve is moving in a step 110. A FLAG indication that the valve is no longer moving is taken to mean that the valve has achieved its new position. The microprocessor will proceed from step 110 to a step 112 and remove the interrupt from the overall control program which issued the original deactivate stage "COMMAND". In this regard, the control program will proceed to deactivate the stages but will do so with an air conditioning system that has already had an expansion valve adjustment in anticipation of the stages being deactivated.

The microprocessor will proceed from step 112 back to a point "B" upstream of step 82 and again await a further "DEACTIVATE STAGE COMMAND" signal from the control program.

While the invention has been described with respect to the aforementioned preferred embodiment, it will be appreciated that many modifications and changes may be made by those skilled in the art without departing from the scope of the invention. For instance, the invention would be equally applicable to a system wherein the valve position was monitored in a different manner such as by a transducer pickup indicating the valve position at all times. Another embodiment of the invention might include providing specific numbers of pulses to the control logic 30 associated with the expansion valve so as to allow the pulses to be timed out from the control logic. It is therefore intended that the scope of the present invention be limited only by the scope of the following claims.

What is claimed is:

1. In an air conditioning system having a plurality of stages of compression for processing refrigerant flowing through an expansion valve, a process for controlling the valve position of the expansion valve when one or more stages of compression are to be deactivated, said process comprising the steps of:
 sensing when one or more stages are to be deactivated;
 interrupting the deactivation of the stages;
 calculating a new valve position for the expansion valve based on the number of stages to be deactivated; and
 commanding the expansion valve to move to the new valve position before releasing said step of interrupting the deactivation of the stages.

2. The process of claim 1 wherein each stage has a define heating or cooling capacity so that the current air conditioning system capacity is equal to the total of all of the defined heating or cooling capacities of the currently active stages and wherein said step of calculating a new valve position for the expansion valve comprises the steps of:
 determining the fractional amount of current air conditioning system capacity to be affected by deactivating the stages;
 reading the current valve position of the expansion valve; and
 multiplying the determined fractional amount of current capacity times the read current valve position of the expansion valve.

3. The process of claim 2 further comprising the steps of:
 checking whether the expansion valve is currently being moved to a previous commanded position; and
 delaying said step of calculating a new valve position of the expansion valve when the expansion valve is currently being moved to the previously commanded position.

4. The process of claim 2 wherein said step of determining the fractional amount of total air conditioning system capacity to be affected by deactivating the stages comprises the steps of;
 summing the capacities of the stages to be deactivated; and
 dividing the summed capacities of the stages to be deactivated by the summed capacities of all active stages in the air conditioning system.

5. The process of claim 6 wherein each stage has a defined cooling capacity so that current air conditioning system capacity is equal to the total of all the defined heating or cooling capacities of the currently active stages and wherein said step of calculating new position for the expansion valve comprises the steps of:
 determining the fractional amount of current air conditioning system capacity to be affected by deactivating the stages;
 reading the current valve position of the expansion valve;
 adjusting the read valve position of the expansion valve by an amount equal to a minimum valve open position; and
 multiplying the determined fractional amount of affected capacity times the adjusted, read valve position.

6. The process of claim 5 further comprising the steps of:
 monitoring any command to move the expansion valve; and
 delaying said step of reading the current valve position of the expansion valve during movement of the expansion valve to the commanded position.

* * * * *